(12) United States Patent
Lim et al.

(10) Patent No.: US 6,487,248 B1
(45) Date of Patent: Nov. 26, 2002

(54) VIDEO DECODING DEVICE OF A TV RECEIVER

(75) Inventors: Il-Taek Lim, Seoul (KR); Seong Ok Bae, Kyungki-do (KR); Seung-Jai Min, Seoul (KR); Sanghee Cho, Seoul (KR); Heesub Lee, Kyungki-do (KR); Kyoungwon Lim, Seoul (KR); Cheol-Hong Min, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/249,789

(22) Filed: Feb. 16, 1999

(30) Foreign Application Priority Data

Feb. 20, 1998 (KR) .............................. 98-5292

(51) Int. Cl.[7] .............................................. H04N 7/12
(52) U.S. Cl. ..................... 375/240.12; 375/21
(58) Field of Search ................ 375/240.12, 240.15, 375/240.16, 240.18, 240.2, 240.21; 348/409.1, 405.1, 441; 382/232, 233, 250; H04N 7/12

(56) References Cited

U.S. PATENT DOCUMENTS

| 5,049,992 A | 9/1991 | Citta et al. |
| 5,262,854 A | 11/1993 | Ng |
| 5,565,925 A | 10/1996 | Kinouchi et al. |
| 5,614,952 A | 3/1997 | Boyce et al. |
| 5,835,151 A | * 11/1998 | Sun et al. ................. 348/441 |
| 6,141,457 A | * 10/2000 | Jahanghir et al. .......... 382/250 |
| 6,333,952 B1 | * 12/2001 | Lim et al. ............... 375/240.37 |

FOREIGN PATENT DOCUMENTS

| EP | 0 707 426 A2 | 4/1996 |
| EP | 0 814 615 A2 | 12/1997 |

* cited by examiner

Primary Examiner—Nhon Diep
(74) Attorney, Agent, or Firm—Fleshner & Kim, LLP

(57) ABSTRACT

A video decoding device for a TV receiver, e.g., SDTV, decodes a compressed video signal transmitted from a transmitting side and displays the decoded signal. The device includes a first downsampling part for downsampling input data in a unit of block at a predetermined ratio; a display size converting part for dividing the downsampled result into a first group of data and a second group of data and after downsampling the first group of data, for performing screen format conversion for the downsampled first group of data into a display size; a memory for storing each of the converted first group of data and the second group of data; and an output part for downsampling the second group of data to correspond with the first group of data to thereby perform screen format conversion for the downsampled second group of data, when the second group of data is reproduced, and for outputting the first and second groups of data.

25 Claims, 5 Drawing Sheets

VIDEO DECODING DEVICE OF A TV RECEIVER

BACKGROUND OF THE INVENTION

1. Field of the Invention

The present invention relates to a decoding device, and more particularly, a video decoding device of a digital TV receiver.

2. Background of the Related Art

A moving pictures expert group (hereinafter "MPEG") standard is recommended as an international standard for compressing and encoding of a digital moving video, preferably in a multimedia environment including digital versatile discs (DVDs) and digital TVs. Particularly, in current digital TVs, a high definition (hereinafter "HD") grade of MPEG compression and restoration is accepted as a standard. Hence, an existing National Television System Committee (hereinafter "NTSC") system type analog TV will be replaced with the digital TV.

Since the price of the HDTV is expensive at the start of the market initiation, a user's demand for a standard definition (hereinafter, referred to as "SD") grade of TV will continue for a long period of time during the replacement of the NTSC type analog TV with the HDTV. The SD grade of TV, e.g., SDTV means a TV, or a settop box, which down-converts an HD grade of signal to display the down-converted signal on an SD grade of monitor, will be widely used. In addition to the HD grade of signal, the SDTV can receive the SD grade of signal. A standard for distinguishing the HD grade of signal and the SD grade of signal is dependent upon the number of picture elements (pels) which influences the determination of the video representation performance (a quality of image).

For instance, the SDTV or the settop box down-converts 1920 pels by 1080 lines 60 Hz interlaced scanning of the HD grade of signal to 720 pels by 480 lines 60 Hz interlaced scanning of the SD grade of signal, thus to display the down-converted HD grade of signal. Of course, the SDTV can display the 720 pels by 480 lines 60 Hz interlaced scanning of the SD grade of signal, without any conversion.

FIG. 1 is a block diagram illustrating a video decoding device in a digital HDTV receiver in the background art. In the typical video decoding device, one pel consists of 8 bits, one macroblock has data structure of 16×16 pels, and the bitstream having the corresponding level to each grade which contains motion vector information is processed.

A variable length decoder (hereinafter "VLD") 101 performs a variable length decoding for bitstream of data inputted and divides the decoded result into motion vectors, quantizing values, and discrete cosine transform (hereinafter "DCT") coefficients. An inverse quantizer (hereinafter "IQ") 102 performs an inverse quantization for the DCT coefficients outputted from the VLD 101 and outputs the inverse-quantized result to an inverse DCT (hereinafter "IDCT") 103.

The IDCT 103 performs an inverse DCT on the inverse-quantized DCT coefficients and outputs the IDCT processed result to an adder 104. The adder 104 adds motion compensated data to the IDCT processed data to thereby restore the added data to the complete video and then stores the restored video in a frame memory 106. The restored video signal is outputted for display and simultaneously fed back to a motion compensator 105 for the motion compensation. The motion compensator 105 outputs an appropriate pel value of the frame memory 106 to the adder 104 by using the motion vectors outputted from the VLD 101.

For the HDTV receiver, the video decoding device receives and restores the HD grade of data and also receives and decodes the SD grade of data, without any problem. However, the video decoding device of the SDTV receiver can receive and restore the SD grade of data without any problem, but the SDTV requires conversion of the HD grade of data to the SD grade of data. In other words, the video decoding device of the SD grade of TV receiver performs data conversion of the HD grade of data into the SD grade of data. The data conversion process is completed through downsampling, i.e., filtering/decimation.

FIG. 2 is a block diagram illustrating the video decoding device of the SD grade of TV receiver for such a conversion. The data block size of 8×8 (shown as 201) is reduced to data block size of 4×4. An IDCT/downsampler 202 performs the inverse discrete cosine transform for the vertical 8 pels in the data block size of 8×8 and for the horizontal 4 pels therein, to thereby reduce the data block size of 8×8 to the data block size of 8×4.

The thirty-two DCT coefficients, as shown by the black dot from the upper end of the data block 201, are selected, and the inverse discrete cosine transform is performed to the 8×4 size of data block for the selected coefficients, thereby obtaining the downsampled image data. The coefficients in the data block size of 8×8 indicated by the white dots are discarded. As can be appreciated by one of ordinary skill, the methods of selecting the coefficients may vary.

The image data which is downsampled to the data block size of 8×4 is stored to a frame (or field) memory 204 through an adder 203. To perform motion compensation, the image data of the frame memory 204 is horizontally upsampled to the data block size of 8×8 in an upsampler 205. The upsampled image data is motion-compensated in a motion compensating circuit 206 by using the motion vectors information. Since the compensated data has the data block size of 8×8, a downsampler 207 performs a horizontal downsampling for the compensated data to a block size 8×4. As a result, the data downsampled to the block size of 8×4 is added to the adder 203. Accordingly, the adder 203 outputs a desired video, e.g., the video downsampled to the data block size of 8×4.

The output value of the frame memory 204 is vertically downsampled to the data block size of 4×4 in a downsampler 208. The downsampled data is outputted to a format converter 209, which converts the downsampled data block size of 4×4 to be matched with the required size and aspect ratio to generate a final video output.

For example, assuming that the input video is the HD grade of 1080 lines and 1920 pels per line, the IDCT/downsampler 202 outputs 1080 lines and 960 pels per line and the downsampler 208 outputs 540 lines and 960 pels per line. Finally, the format converter 209 outputs 480 lines and 720 pels per line.

However, the conventional decoding device of the SD grade of digital TV receiver has various disadvantages. For example, since the HD grade of data is downsampled horizontally to ½ size, the size of the frame memory is reduced to ½ compared to the HD grade of decoder. Hence, the existing SD grade of decoder needs 4,590 kByte size memory which is half of the 9,180 kByte size memory of the HD grade of decoder. However, the 4,590 kByte size of the SDTV video decoder is larger than the standard 4 MByte DRAM, which increases cost.

SUMMARY OF THE INVENTION

An object of the present invention is to at least obviate one or more of the problems due to limitations and disadvantages of the related art or other conventional art.

Another object of the present invention is to decrease the memory size.

A further object of the present invention is to use standard memory size.

A further object of the invention is to convert HD signals to SD signals.

Still another object of the present invention is to decrease costs.

Another object of the invention is to provide a video decoding device of a digital TV receiver which separates pictures I and P from a picture B, downsamples each of the separated pictures and converts the downsampled pictures into a display size matched to a screen size and format, thus to have a small size of frame memory.

The present invention can be achieved in a whole or in parts by a video decoding device of a digital TV receiver that converts the picture B which is not an anchor frame into the display size matched to a screen aspect ratio and performs data encoding for the converted picture to thereby store the encoded result in a memory, and on the other hand, it performs data encoding for the pictures I and P to store the encoded result in the memory, whereby memory capacity required therein can be reduced.

The present invention can be achieved in a whole or in parts by a video decoding device of a digital TV receiver is that outputs the picture B after completion of data decoding and outputs the pictures I and P after completion of the data decoding and format conversion to an adequate screen size and aspect ratio, whereby the memory capacity required therein can be reduced and a high quality of picture can be ensured.

The present invention can be achieved in a whole or in parts by a device for a television that converts a first data format to a final data format, comprising a decoder circuit that receives the first data format at an input port and decodes the first data format to output a second data format and the final data format at first and second output ports; an encoder circuit that receives the second data format at an input port and encodes the second data format to output a third data format at an output port; and a memory coupled to the decoder and encoder, the memory storing the third data format received from the encoder and providing the third data format to said decoder circuit for decoding into the final data format.

The present invention can be achieved in a whole or in parts by a television receiver comprising a tuner for selecting a prescribed transmitted signal received via an antenna; a decoder for decoding a signal selected by the tuner into a bitstream of a first data format; a device that converts the first data format to a final data format; a display for displaying an image based on the final data format, wherein the device includes a decoder circuit that receives the first data format at an input port and decodes the first data format to output a second data format and the final data format at first and second output ports; an encoder circuit that receives the second data format at an input port and encodes the second data format to output a third data format at an output port; and a memory coupled to the decoder and encoder, the memory storing the third data format received from the encoder and providing the third data format to said decoder circuit for decoding into the final data format.

The present invention can be achieved in a whole or in parts by a method of decoding an input data of a television receiver, comprising the steps of downsampling the input data in a unit of block at a predetermined ratio; dividing the downsampled result into a first group of data and a second group of data and after downsampling the first group of data, performing screen format conversion of the downsampled first group of data for a display size and aspect ratio; storing in a memory each of the converted first group of data and the second group of data; downsampling the second group of data to correspond with the first group of data to thereby perform screen format conversion for the downsampled second group of data; and outputting the first and second groups of data when the second group of data is reproduced.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

In a preferred embodiment of the present invention, the I, P and B pictures are downsampled to a data size of 8×4, and after completion of downsampling to a data size of 4×4, format conversion and data encoding, the B picture is stored in a B frame memory. After completion of the data encoding, on the other hand, the I and P pictures are stored in an anchor frame memory. Thereafter, the B picture is data decoded to be displayed, and the I and P pictures are data decoded, downsampled to a data size of 4×4, and format converted, thus to be outputted together with the B picture.

As a result, a video decoding device according to a preferred embodiment of the present invention requires approximately 3 MByte frame memory, and the whole system can be embodied by using, e.g., 4 MByte DRAM. As can be appreciated, the examples of the downsampling ratio and the number of pels are not limited to the specific embodiments described in the present invention.

Figure 1:
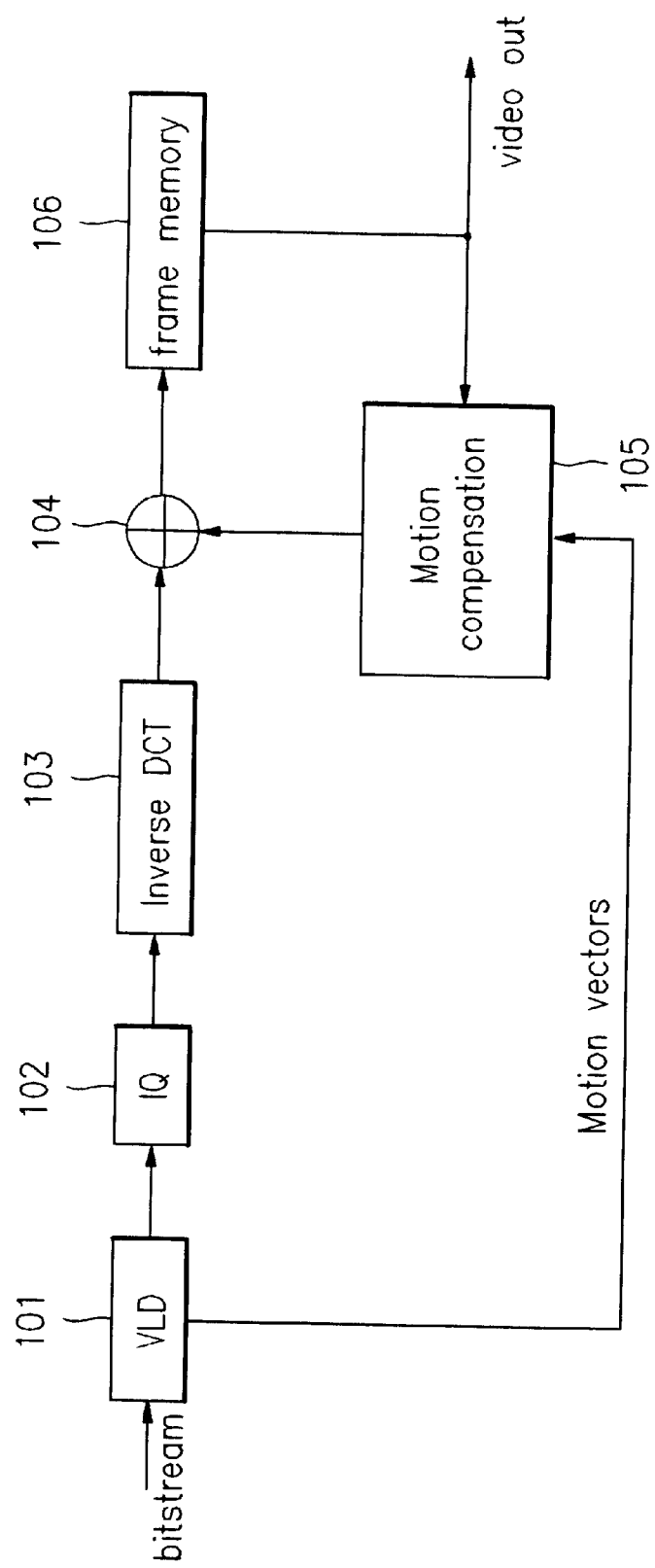
FIG. 1 is a block diagram illustrating the video decoding device of a digital HDTV receiver in the background art.
Figure 2:
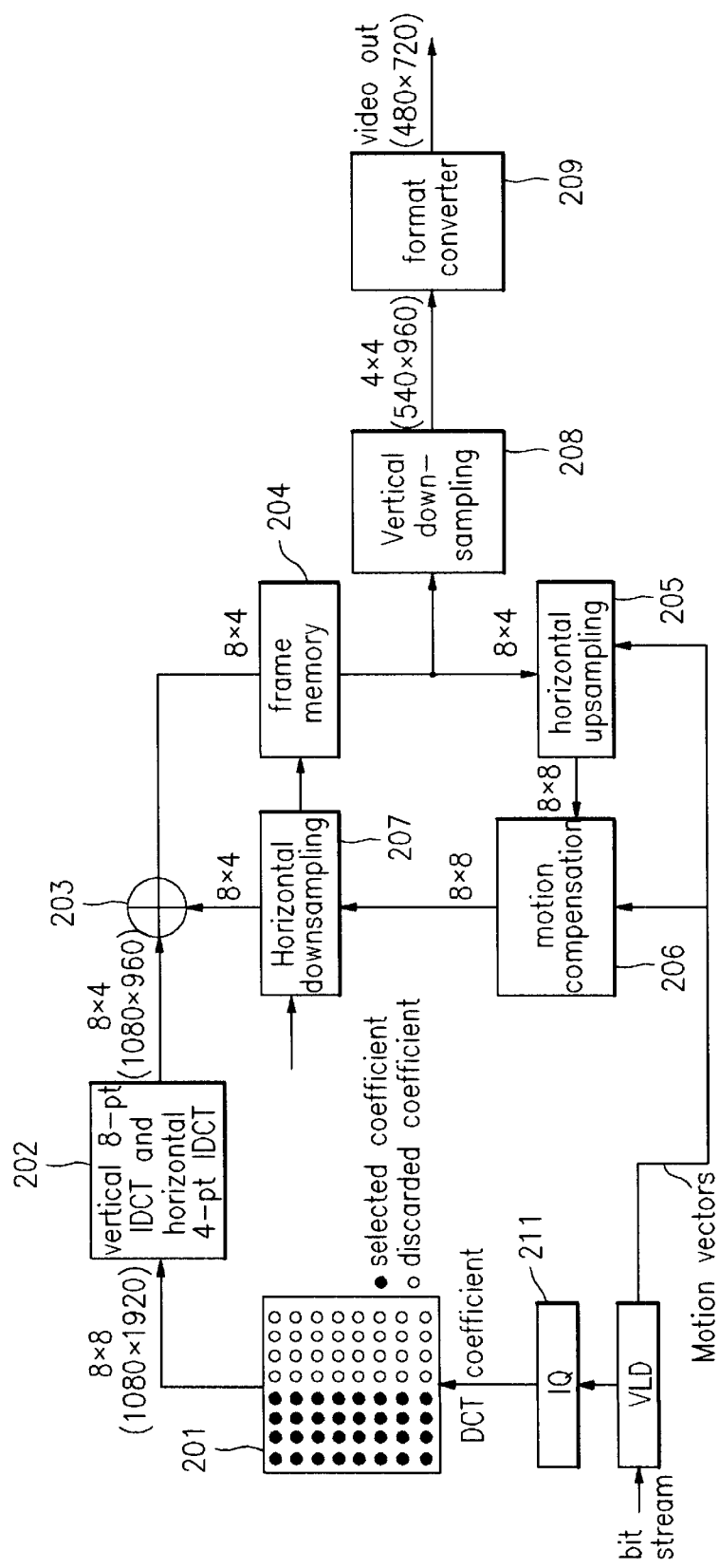
FIG. 2 is a block diagram illustrating the downsampling in a video decoding device of a digital SDTV receiver in the background art.
Figure 3:
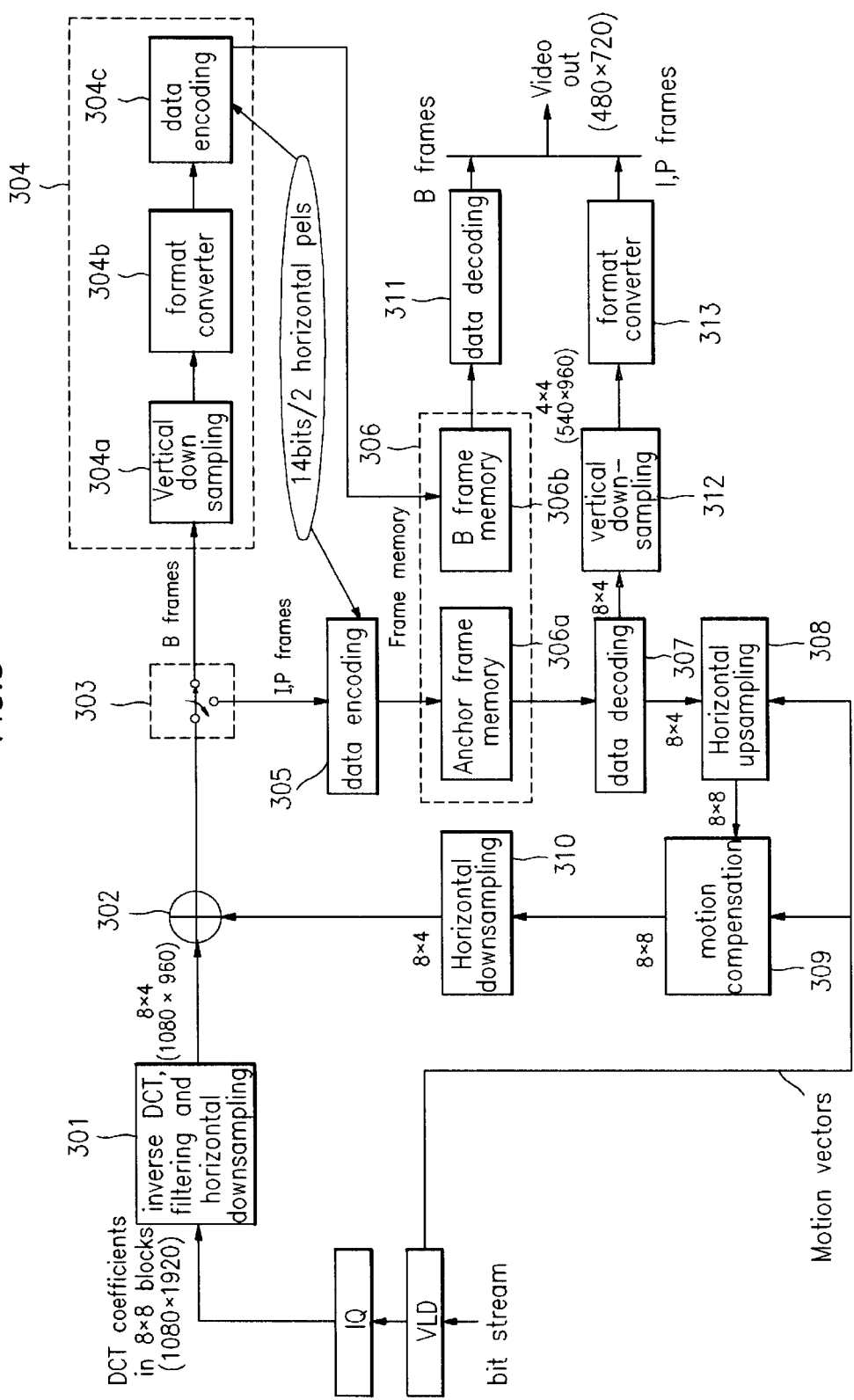
FIG. 3 is a block diagram illustrating a video decoding device of a digital TV receiver in accordance with a preferred embodiment of the present invention.

FIG. 3 is a block diagram illustrating the video decoding device of a SDTV, preferably digital, receiver constructed in accordance with a preferred embodiment of the present invention. In addition to a VLD and an IQ, an IDCT/downsampler 301 receives DCT coefficients (I, P and B pictures) of a data size of 8×8 and performs IDCT, filtering and horizontal-downsampling to thereby output a data size of 8×4. An adder 302 adds the data size of 8×4 to motion compensated data, and a switch 303 controls the outputs of the I, P and B pictures in a data size of 8×4 outputted from the adder 302.

A display size converter 304 performs a vertical downsampling, format conversion and data encoding for the B picture selected in the switch 303 to thereby convert the display size of the B picture, while a data encoder 305 performs the data encoding for the I and P pictures selected in the switch 303. A memory 306 comprises an anchor frame memory 306a to store the data encoded I and P pictures and a B frame memory 306b to store the converted display size of the B picture. A data decoder 307 performs data decoding for the data of I and P pictures outputted from the anchor frame memory 306a. A horizontal upsampler 308 horizontally upsamples the decoded data of I and P pictures to thereby convert the data of size 8×4 into the data size of 8×8.

A motion compensator 309 performs a motion compensation by using the output of the horizontal upsampler 308 and motion vectors. A horizontal downsampler 310 horizontally downsamples the output of the motion compensator 309 to a data size of 8×4 to thereby the converted result to the adder 302, and a data decoder 311 decodes the output of the B frame memory 306b. A vertical downsampler 312 vertically downsamples the decoded data of I and P pictures in the data decoder 307 to thereby convert the data size of 8×4 into a data size of 4×4. A format converter 313 converts the output of the vertical downsampler 312 in accordance with the size and aspect ratio of the display device.

The display size converter 304 comprises a downsampler 304a for vertically downsampling the B picture selected in the switch 303, a format converter 304b for converting the size and aspect ratio of the downsampled B picture for display, and a data encoder 304c for performing data encoding for the format converted data of the B picture.

Figure 4:
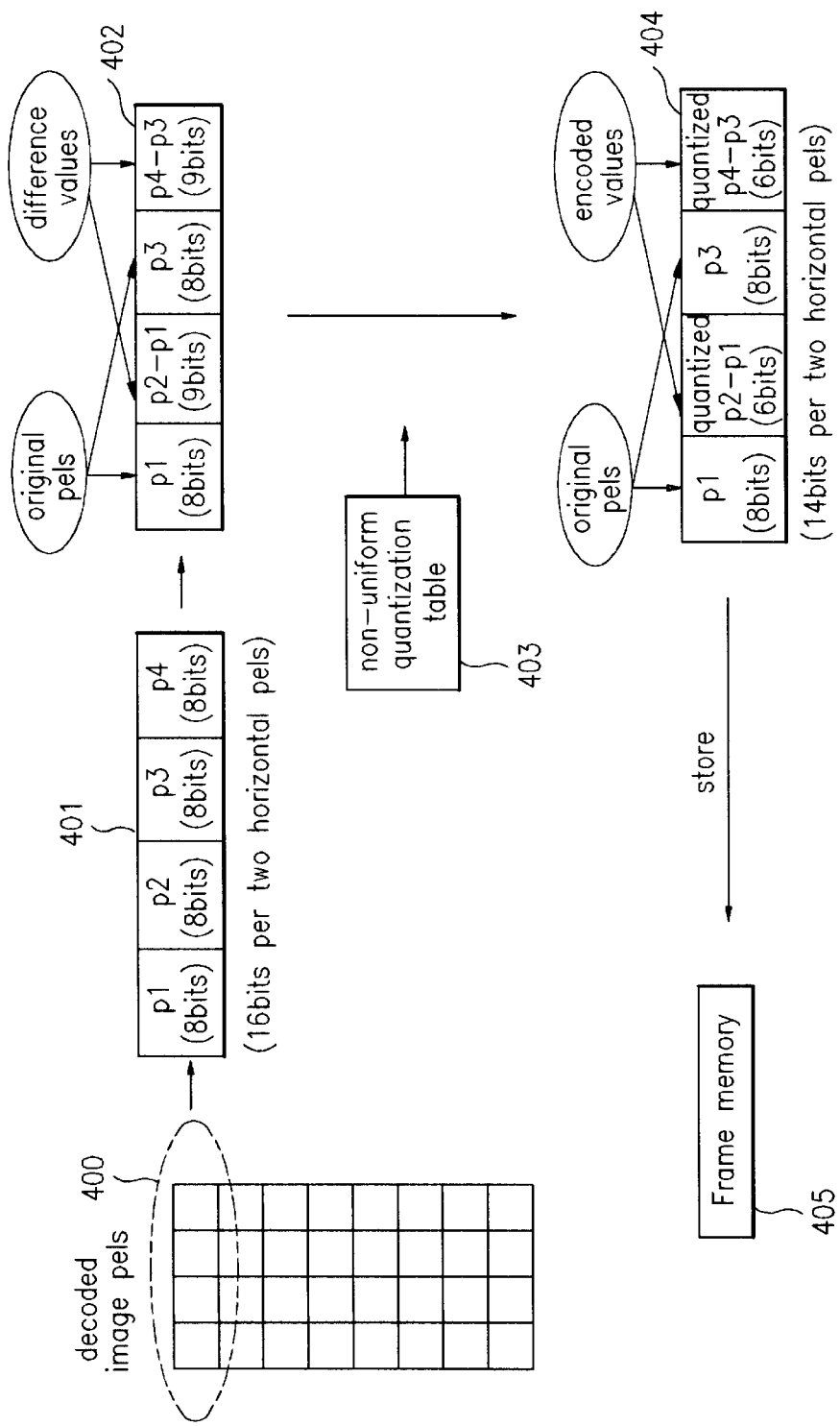
FIG. 4 is a block diagram illustrating the data encoding process in accordance with a preferred embodiment of the present invention.

FIG. 4 is a block diagram illustrating the data encoding process in accordance with a preferred embodiment of the present invention. As discussed, the IDCT/downsampler 301 performs the IDCT for the DCT coefficients received in a size data 8×8 and filters horizontally downsamples the IDCT processed data to the data size of 8×4. The downsampling of the data size of 8×4 is performed for the I, P and B pictures, and the downsampled data is outputted to the adder 302. As can be appreciated, the downsampling and upsampling can be achieved in various manners.

The adder 302 adds the downsampled data size of 8×4 and the motion compensated data size of 8×4 and outputs the added result to the switch 303. If the input is at least one I and P pictures, the switch 303 outputs the I and/or P pictures to the data encoder 305 and if the input is a B picture, the B picture is provided to the display size converter 304.

The vertical downsampling, the format conversion and the data encoding for the B picture are performed in the display size converter 304. The vertical downsampler 304a of the display size converter 304 performs the vertical downsampling for the data size of 8×4 of the B picture to the data size of 4×4 and outputs the downsampled data to the format converter 304b. The format converter 304b performs size and aspect ratio conversion for the data size of 4×4 of the B picture to be matched to a display size and its aspect ratio. Thereafter, the data encoder 304c reduces the number of bits of the data for B picture and stores the reduced number of bits of data in the B frame memory 306b of the memory 306.

The encoding for the reduction of the number of bits performed by the data encoder 304c are shown in FIG. 4, which is also applied to the data encoder 305 for the I and/or P pictures. As can be appreciated, the data decoding is completed in the reverse of the data encoding. As shown, the number of bits is reduced based on the limited capacity of the memory 306, and a method of reducing the number of bits is based upon the correlation of pels adjacent thereto. In particular, the basic number of bits is a data size of 8×4 and is horizontally (or vertically) reduced to 14 bits in consideration of the correlation of the adjacent pixels.

An example of the method of reducing the number of bits is given with differential pulse code modulation (DPCM). In other words, the horizontal (or vertical) pels p1, p2, p3 and p4 401 of decoded image pels 400 are each encoded to p1 (original value), p2-p1 (difference value between adjacent pels), p3 (original value), and p4-p3 (difference value between adjacent pels) 402. With the application of non-uniform quantization table 403, the p1 is encoded to an 8 bit value, the p2-p1 to a 6 bit value, the p3 to an 8 bit value, and the p4-p3 to a 6 bit value. The encoded result 404 is stored in a corresponding frame memory 405, which may be the anchor frame memory 306a or the B frame memory 306b shown in FIG. 3. The reduced number of bits of data is stored in the B frame memory 306b, and the stored data is decoded in the reverse of the data encoding in the data decoder 311 for the image restoration (representation). By the selection of the switch 303, the number of bits of data of the I and P pictures is reduced by the data encoder 305, which is stored in the anchor frame memory 306a. Then, the stored data is decoded in the reverse of the data encoding in the data decoder 307 for the image restoration.

The data size of 8×4 decoded in the data decoder 307 is inputted to the horizontal upsampler 308 for the motion compensation, and the horizontal upsampler 308 horizontally upsamples the data size of 8×4 to the data size of 8×8 by using inputted motion vectors. The upsampled data size of 8×8 in the horizontal upsampler 308 is inputted to the motion compensator 309, which compensates the motion of the data size of 8×8 by using the inputted motion vectors and outputs the compensated result to the horizontal downsampler 310.

The horizontal downsampler 310 horizontally downsamples the motion compensated data size of 8×8 to the data size of 8×4 and supplies the downsampled data to the adder 302. As a result, after the downsampling to the data size of 8×4 by the IDCT/downsampler 301, the motion compensated signals of the I, P and B pictures matched to the data size of the I, P and B pictures are finally outputted. After repeating the above procedure, the data process for each of the frames of I, P and B pictures is completed.

On the other hand, the data size of 8×4 outputted and decoded from the anchor frame memory 306a is vertically downsampled to the data size of 4×4 (which is matched to the B picture downsampled to the data size of 4×4). Next, the format conversion for the I and P pictures is performed to be matched to the display size and its aspect ratio, and the format converted I and P pictures are outputted as a final video signal together with the data of B picture.

Figure 5:
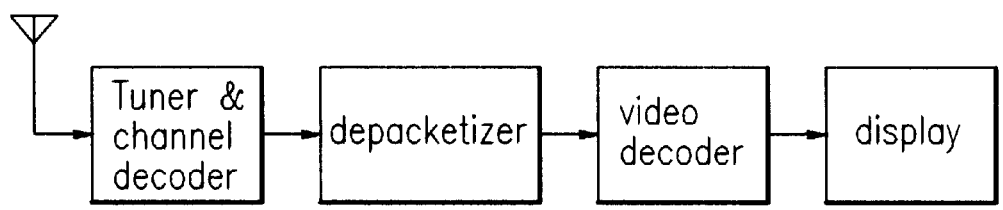
FIG. 5 is a block diagram of a TV receiver incorporating the preferred embodiment.

FIG. 5 illustrates an overall block diagram of a digital TV incorporating the video decoder in accordance with a preferred embodiment of the present invention. The TV includes a tuner and a channel decoder for receiving signals transmitted from a broadcasting station through, e.g., an antenna and decodes the signal. If the data is decoded in units of packets, a depacketizer separates a signal received from the tuner and channel decoder into a video and/or audio bitstream. The video bit stream is decoded by the video decoder in accordance with a preferred embodiment of the present invention and provided to a display. As can be appreciated, the video decoder can be implemented as a settop box for the TV or a PC add-in card.

A video decoding device of a SDTV receiver according to the present invention can store anchor frames I and P and a frame B in different methods, in receiving and processing the HD grade of video in the SDTV receiver using MPEG standard, and introduce a method of reducing the number of bits, such that the capacity of memory required can be reduced and the quality of image can be maintained.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A device for a television that converts a first data format to a final data format, comprising:
    a decoder circuit that receives the first data format at an input port and decodes the first data format to output a second data format and the final data format at first and second output ports, respectively;
    an encoder circuit that receives the second data format at an input port and encodes the second data format output to a third data format at an output port; and
    a memory storing the third data format received from the encoder circuit, wherein said decoder circuit includes a first decoder for decoding the third data format received from said memory into the final data format provided at the second output port of said decoder circuit.

2. The device of claim 1, wherein the first data format is a video bitstream, the second data format is a pixel data, the third data format is an encoded pixel data and the final data format is a video data.

3. The device of claim 1, wherein said encoder circuit comprises:
    a switch coupled to said decoder circuit, said switch dividing the second data format into a first data group of a first prescribed bit number and a second data group of a second prescribed bit number;
    a first encoder that encodes the first data group such that the encoded first data group has a smaller bit number than the first prescribed bit number;
    a converter that converts the second data group such that the converted second data group has a smaller size than the second prescribed bit number, wherein said encoded first data group and converted second data group is provided to said memory as the third data format.

4. The device of claim 3, wherein the second data format is divided into the first and second data groups based on whether the second data format is one of P, I and B pictures.

5. The device of claim 4, wherein the first data group is based on the second data format being at least one of I picture and P picture, and the second data group is based on the second data format being a B picture.

6. The device of claim 1, wherein said memory is a DRAM.

7. The device of claim 3, wherein said converter comprises:
    a first down sampler that down samples the second data group;
    a format converter that converts size and aspect ratio of the down sampled second data group; and
    a second encoder that encodes the converted down sampled second data group having the smaller size than the second prescribed bit number.

8. The device of claim 7, wherein at least one of said first encoder and said second encoder reduces the number of bits by using a correlation of adjacent pixels and a non-uniform quantization.

9. The device of claim 3, wherein said first decoder decodes the encoded first data group and said decoder circuit further comprises:
    a vertical down sampler that vertically down samples the first data group from said first decoder;
    a format converter that converts size and aspect ratio of the down sampled first data group to provide a first video output; and
    a second decoder that decodes the converted second data group to provide a second video output, wherein said first and second video outputs comprise the final data format.

10. The device of claim 9, wherein said decoder circuit further comprises:
    a variable length decoder that receives the first data format of a video bitstream to output at least one of DCT coefficients and motion vectors;
    an inverse quantizer that inverse quantizes the DCT coefficients to output inverse quantized DCT coefficients; and
    an inverse discrete coefficient transformer/downsampler coupled to the inverse quantizer.

11. The device of claim 10, wherein said decoder circuit further comprises:
    a horizontal up-sampler that up-samples the first data group from said first decoder and coupled to receive the motion vectors from said variable length decoder;
    a motion compensator coupled to receive the up-sampled first data group from the horizontal up-sampler and coupled to receive the motion vectors from said variable length decoder;
    a horizontal down-sampler coupled to said motion compensator to down sample an output from said motion compensator; and
    an adder that adds the outputs of said horizontal down-sampler and inverse discrete cosine transformer/downsampler to provide the second data format to said encoder circuit.

12. A television receiver, comprising:
    a tuner for selecting a prescribed transmitted signal;
    a decoder for decoding a signal selected by said tuner into a bitstream of a first data format;
    a device that converts the first data format to a final data format;
    a display for displaying an image based on the final data format, wherein said device includes:
        a decoder circuit that receives the first data format at an input port and decodes the first data format to output a second data format and the final data format at first and second output ports, respectively;
        an encoder circuit that receives the second data format at an input port and encodes the second data format to output a third data format at an output port; and
        a memory storing the third data format received from the encoder circuit, wherein said decoder circuit includes a first decoder for decoding the third data format received from said memory into the final data format provided at the second output port of said decoder circuit.

13. A method of decoding an input data of a television receiver, comprising the steps of:

downsampling the input data in a unit of block at a predetermined ratio;

dividing the downsampled result into a first group of data and a second group of data and after downsampling the first group of data, performing screen format conversion of the downsampled first group of data for a display size and aspect ratio;

storing in a memory each of the converted first group of data and the second group of data;

downsampling the second group of data to correspond with the first group of data to thereby perform screen format conversion for the downsampled second group of data; and outputting the first and second groups of data when the second group of data is reproduced.

14. The method of claim 13, further comprising the step of performing a reduction of the number of bits for the second group of data which has been downsampled to output the reduced number of bits stored in the memory.

15. The method of claim 14, wherein the number of bits are reduced at least one of horizontally and vertically by using a correlation of adjacent pixels.

16. The method of claim 15, wherein an original pixel value is reduced to an 8 bit value and a differential value between adjacent pixels is reduced to a 6 bit value by non-uniform quantization.

17. The method of claim 13, further comprising a step of performing reduction of the number of bits for the first group of data which has been format converted to output the reduced number of bits to the memory.

18. The method of claim 13, further comprising a step of performing data decoding for the first group of data which has been stored in said memory to thereby output the decoded result during a reproduction step.

19. The method of claim 13, further comprising a step of performing data decoding for the second group of data which has been stored in said memory;

downsampling the decoded data; and performing screen format conversion of the downsampled data for display size and aspect ratio.

20. The method of claim 13, wherein the step of downsampling comprises:

performing an inverse discrete cosine transform (IDCT) for all picture data of size 8×8 block inputted in the unit of block;

performing a horizontal downsampling for the IDCT processed data; and adding the downsampled data to motion compensated data to thereby output data of size 8×4 block as the added result.

21. The method of claim 13, wherein the step of dividing includes a vertical downsampling of the first group of data inputted in a data of size 8×4 block to convert the downsampled data into the data of size 4×4 block and performing the screen format conversion for the downsampled data.

22. The method of claim 19, wherein the step of downsampling the decoded data includes vertical downsampling of the second group of data decoded and converting the downsampled data into a data of size 4×4 block to thereby output the downsampled result.

23. The method of claim 13, further comprising:

performing a horizontal upsampling of the second group of data decoded to convert the upsampled data into a data of size 8×8 block performing motion compensation based upon the step of horizontal upsampling; and performing a horizontal downsampling after the motion compensating step to the data size 8×4 block to thereby output the downsampled data.

24. The method of claim 13, further comprising the step of selectively dividing and outputting the first and second groups of data.

25. The method of claim 13, wherein said first group of data is picture data comprises B picture, and said second group of data comprises I and P pictures.

* * * * *